United States Patent Office 2,917,484
Patented Dec. 15, 1959

2,917,484

POLYMERS

Raymond J. Kray and Frank Brown, Summit, N.J., assignors to Celanese Corporation of America, New York, N.Y., a corporation of Delaware No Drawing. Application February 8, 1956
Serial No. 564,122

19 Claims. (Cl. 260—45.4)

This invention relates to polymers and relates more particularly to new polymers containing ester linkages and also to a novel process for preparing said polymers.

An important object of this invention is to provide a group of new polymers containing ester linkages.

Other objects of this invention will be apparent from the following detailed description and claims.

According to the present invention, it has been found that polybasic organic acids will react with diallylidene pentaerythritols, whether substituted or not, to produce polymers ranging from soft rubbery to hard materials. Advantageously, the polymerization is carried out in the presence of a catalyst comprising an electrophilic agent. The polymerization may be carried out in the melt, or with the starting reactants dissolved in a common solvent. The use of a solvent is particularly desirable where one or the other of the starting materials has an extremely high melting point and is insoluble in the other starting material so that there would be the danger of decomposition if the starting materials were heated to a temperature sufficiently high to form a melt.

Examples of polybasic acids that may be employed in forming the polymers of this invention are the dibasic carboxylic acids including the polymethylene dicarboxylic acids containing two or more carbon atoms such as oxalic acid, malonic acid, succinic acid, glutaric acid, adipic acid, pimelic acid, suberic acid, azelaic acid, sebacic acid, and the like. There may also be used substituted dicarboxylic acids such as citric acid, tartaric acid, malic acid, chlorosuccinic acid and methylene disalicylic acid. Polybasic acids containing more than two carboxyl groups that may also be employed are tricarballytic acid, aconitic acid and citric acid. Aromatic acids may also be employed in forming the polymers of this invention including, for example, orthophthalic acid, isophthalic acid, terephthalic acid, diphenic acid, pyromellitic acid and mellitic acid. In addition to saturated acids, there may be employed unsaturated acids, preferably, $\alpha$-$\beta$ ethylenically unsaturated acids, for example, maleic acid, fumaric acid, citraconic acid, mesaconic acid and glutaconic acid.

The polymer may be made using but a single polybasic acid or a mixture of such acids, to obtain the desired properties in the final product. For example, when the polymer is prepared from an unsaturated polybasic acid, there may also be employed a proportion of a saturated polybasic acid to control the degree of unsaturation of the polymer obtained. The polybasic acids may be used as such or in the form of their ester-forming derivatives, for example, their anhydrides, acids, chlorides, esters of lower aliphatic alcohols and the like, all hereinafter referred to as polybasic acids. The reaction mixture may contain, in addition to the polybasic acid, a small proportion, ranging up to 10% by weight of the polybasic acid, of a monobasic acid to act as a chain stopper and permit a polymer of predetermined molecular weight to be achieved. Examples of suitable monobasic acids that may be used for this purpose include acetic acid, propionic acid, butyric acid, valeric acid, stearic acid and benzoic acid.

The polybasic acid is reacted with a diallylidene pentaerythritol which may or not be substituted. These diallylidene pentaerythritols may be prepared by condensing $\alpha,\beta$-unsaturated aldehydes, for example, acrolein, methacrolein, crotonaldehyde, or acetals like chlorallylidene diacetate with pentaerythritol in the presence of a strong acid catalyst, for example, phosphoric acid.

The polybasic acid and the diallylidene pentaerythritol are advantageously reacted together in such proportions that there is present in the reaction mixture approximately one acid group for each allylidene group and, preferably, no more than a 10% excess of either group. However, it is also possible to form a polymer with a substantial excess of one or the other groups, particularly since a number of different reactions occur during the polymerization. In the latter case, the degree of polymerization will normally be lower than when approximately equal numbers of each group are present.

The polymerization is carried out in the presence of a catalyst comprising an electrophilic agent such as a strong acid or a Lewis acid. Examples of strong acids are the aromatic and alkane sulfonic acids, for example, p-toluene sulfonic acid, m-benzene disulfonic acid, camphor sulfonic acid, 2-chlorcymol-5-sulfonic acid, methane sulfonic acid and ethane sulfonic acid. Other strong acids are phosphoric and oxalic acids. Examples of Lewis acids are aluminum trichloride, boron trifluoride and stannic chloride. The quantity of catalyst should be between 0.04 and 1.0% by weight based on the weight of polymer.

The diallylidene pentaerythritol and the polybasic acid are brought together in the presence of the catalyst to cause the polymerization to proceed. For example, the diallylidene pentaerythritol, polybasic acid and catalyst may be heated together until a homogeneous melt is obtained and then held at an elevated temperature until the desired degree of polymerization has been achieved. Temperatures suitable for this purpose are from 50 to 150° C. and will bring about the desired polymerization in 2 to 24 hours. It is also possible to dissolve the reactants and the catalyst in an inert solvent, for example dioxane, dimethyl sulfoxide, ethyl acetate, chloroform, and acetone and heat the solution to a temperature of between 50 and 150° C. until the polymerization has taken place, which will normally occur in between about 2 to 24 hours.

The polymers obtained in accordance with this invention are thermosetting and are suitable for casting, coating, impregnating, molding, potting and similar uses. There may be mixed with these polymers suitable amounts of pigments, dyestuffs, plasticizers and other substances capable of altering the properties or appearance of the final product.

When the polymer of this invention is prepared from a polybasic unsaturated acid, the product obtained will contain unsaturated groups. Such polymer may be mixed with an ethylenically unsaturated monomer and the two copolymerized. Examples of suitable ethylenically unsaturated monomers that may be employed for this purpose are styrene, divinyl benzene, diallyl phthalate, diallyl maleate and methyl methacrylate. To cause the copolymerization to take place, there may be advantageously incorporated into the mixture from 0.2 to 5.0% by weight of a suitable catalyst, for example, benzoyl peroxide, azobisisobutylronitrile, azoisovaleronitrile, or lauroyl peroxide. It is desirable when preparing a copolymer according to the process of this invention to mix the ethylenically-unsaturated monomer with the diallylidene pentaerythritol-polybasic unsaturated acid polymer before the polymerization of the latter has progressed sufficiently to render the said polymer insoluble in the monomer. The proportion of the ethylenically-unsaturated monomer should range between 10 and 90% by weight based on the weight of the polymer.

The precise nature of all the reactions that occur during the polymerization is not known. However, it is believed that the acid groups of the polybasic acid react across the double bond of the allylidene group to produce an ester linkage. This view is confirmed by the fact that the polymer shows ester linkages by infra-red analysis.

The following examples are given to illustrate this invention further:

Example I

There are stirred together rapidly under a nitrogen atmosphere 21.2 parts by weight of diallylidene pentaerythritol and 14.6 parts by weight of adipic acid, at a temperature of 150° C., until the adipic acid is melted and a single liquid phase is formed. The temperature is lowered to 135° C. and there is added to the melt 0.164 part by weight of p-toluene sulfonic acid dissolved in 0.176 part of hot n-butyl acetate. The melt is stirred for 20 minutes while holding the temperature between 135 and 140° C. Then the melt is poured into a mold and cured at 120° C. for 16 hours. There is obtained a soft rubbery polymer.

Example II

There are stirred together rapidly under a nitrogen atmosphere 21.2 parts by weight of diallylidene pentaerythritol and 20.2 parts by weight of sebacic acid, at a temperature of 130° C., until the sebacic acid is melted and a single liquid phase is present. The temperature is lowered to 125° C. and there is added to the melt 0.164 part by weight of p-toluene sulfonic acid dissolved in 0.176 part of hot n-butyl acetate. The melt is stirred for 20 minutes while holding the temperature between 120 and 125° C. Then the melt is poured into a mold and cured at 120° C. for 16 hours. There is obtained a soft rubbery polymer.

Example III

There are stirred together rapidly under a nitrogen atmosphere 21.2 parts by weight of diallylidene pentaerythritol, 13.2 parts by weight of glutaric acid and 0.082 part by weight of ethane sulfonic acid, at a temperature of 95° C., for a period of 30 minutes during which time the glutaric acid dissolves. The syrupy melt is then poured into a mold and cured at 85° C. for 21 hours. There is obtained a soft rubbery polymer.

Example IV

There are stirred together rapidly under a nitrogen atmosphere 21.2 parts by weight of diallylidene pentaerythritol, 16.0 parts by weight of pimelic acid and 0.082 part by weight of p-toluene sulfonic acid dissolved in 0.0882 part by weight of hot n-butyl acetate, at a temperature of 80° C., for a period of 20 minutes, during which time a single phase melt forms. The syrupy melt is then poured into a mold and cured at 90° C. for 24 hours. There is obtained an amber colored, soft, elastic polymer.

Example V

There are stirred together rapidly under a nitrogen atmosphere 21.2 parts by weight of diallylidene pentaerythritol and 11.6 parts by weight of maleic acid, at a temperature of 105° C., for a period of 1 hour, during which time the maleic acid dissolves. There is added to the melt with stirring 0.016 part by weight of ethane sulfonic acid. The syrupy melt is then poured into a mold and cured at 85° C. for 16 hours. There is obtained a hard, glass-like polymer.

Example VI

There are stirred together rapidly under a nitrogen atmosphere 21.2 parts by weight of diallylidene pentaerythritol, 11.6 parts by weight of maleic acid, and 0.016 part by weight of ethane sulfonic acid at 80° C. for 30 minutes. The homogeneous melt is then dissolved in 10.4 parts by weight of styrene. There is then added to the solution 0.20 part by weight of benzoyl peroxide and the solution is poured into a mold and cured at 90° C. for 2 hours. There is obtained a hard, glass-like polymer.

It is to be understood that the foregoing detailed description is merely given by way of illustration and that many variations may be made therein without departing from the spirit of our invention.

Having described our invention what we desire to secure by Letters Patent is:

1. Process for the production of resinous products which comprises reacting, by heating, a diallylidene pentaerythritol with a polycarboxylic acid having, as its reactive groups, 2 to 6 carboxylic acid groups, the proportions in the reaction mixture being on the order of those providing one reactive carboxylic acid group per reactive allylidene group, to produce a polymer.

2. Process as set forth in claim 1 in which the polycarboxylic acid is ethylenically unsaturated.

3. Process as set forth in claim 2 in which the polycarboxylic acid is a dicarboxylic acid.

4. Process as set forth in claim 1 in which the polycarboxylic acid is a dicarboxylic acid.

5. Process as set forth in claim 1 in which the proportions are such that there is at most a 10% excess of one of said reactive groups.

6. Process as set forth in claim 1 in which said polycarboxylic acid is alpha, beta-ethylenically unsaturated and said polymer is subjected to further addition polymerization with an ethylenically unsaturated monomer copolymerizable therewith.

7. Process as set forth in claim 6 in which said polycarboxylic acid is a dicarboxylic acid.

8. Process as set forth in claim 7 in which said polycarboxylic acid is maleic acid and said monomer is styrene.

9. Process as set forth in claim 1 in which the reaction is effected at a temperature of 50 to 150° C.

10. Process as set forth in claim 1 in which the reaction is effected in the presence, as a catalyst, of an acid at least as strong as phosphoric acid.

11. Process as set forth in claim 1 in which the reaction is effected in the presence, as a catalyst, of an electrophilic agent selected from the group consisting of p-toluene sulfonic acid, m-benzene disulfonic acid, camphor sulfonic acid, 2-chlorcymol-5-sulfonic acid, methane sulfonic acid, ethane sulfonic acid, phosphoric acid, oxalic acid, aluminum trichloride, boron trifluoride and stannic chloride.

12. Process as set forth in claim 11 in which the reaction temperature is 50 to 150° C. and the amount of catalyst is 0.04 to 1% by weight based on the weight of polymer.

13. Process as set forth in claim 10 in which the reaction temperature is 50 to 150° C. and the amount of catalyst is 0.04 to 1% by weight based on the weight of polymer.

14. Process as set forth in claim 12 in which said polycarboxylic acid is alpha, beta-ethylenically unsaturated and said polymer is subjected to further addition polymerization with an ethylenically unsaturated monomer copolymerizable therewith.

15. Process as set forth in claim 14 in which the proportion of monomer is about 10 to 90% by weight based on the weight of the polymer.

16. Process as set forth in claim 15 in which the polycarboxylic acid is maleic acid, the other reactant to form the polymer is diallylidene pentaerythritol, and the monomer is styrene.

17. Polymer obtained in accordance with the process of claim 1.

18. Copolymer obtained in accordance with the process of claim 6.

19. Polymer obtained in accordance with the process of claim 16.

References Cited in the file of this patent

UNITED STATES PATENTS

| | | |
|---|---|---|
| 2,255,313 | Ellis | Sept. 9, 1941 |
| 2,687,407 | Orth | Aug. 24, 1954 |

OTHER REFERENCES

Pauling: General Chemistry, Freeman (1947), pages 394-399. (Copy in Scientific Library.)

Shulz et al.: Angewandte Chemie, vol. 62, No. 5, March 1950, pages 105-118. (Copy in Scientific Library.)

Moeller: Inorganic Chemistry, Wiley (1952), page 327. (Copy in Scientific Library.)